United States Patent [19]

Worthington et al.

[11] 4,289,609
[45] Sep. 15, 1981

[54] PROCESS FOR REMOVING SOLID ORGANIC MATERIALS AND OTHER IMPURITIES FROM WET-PROCESS PHOSPHORIC ACID

[75] Inventors: Ralph E. Worthington, Winter Haven; Donald A. Luke, Temple Terrace; Stanton L. Reese, Lakeland, all of Fla.

[73] Assignee: Uranium Recovery Corporation, Mulberry, Fla.

[21] Appl. No.: 902,105

[22] Filed: May 2, 1978

[51] Int. Cl.³ .............................................. B03B 1/02
[52] U.S. Cl. ..................... 209/11; 209/164; 209/168; 209/166; 423/321 S
[58] Field of Search ............... 209/3, 4, 10, 11, 166, 209/164, 162, 163, 2, 168-170; 423/167, 319, 320, 321 S, 321 R; 210/44

[56] References Cited

U.S. PATENT DOCUMENTS

| | | | |
|---|---|---|---|
| 1,253,653 | 1/1918 | Welsch | 209/166 |
| 1,277,750 | 9/1918 | Pearce | 209/160 |
| 1,426,596 | 8/1922 | Peck | 210/44 X |
| 1,706,281 | 9/1930 | Elmore | 209/166 |
| 2,130,144 | 9/1938 | McClave | 209/166 |
| 2,317,139 | 4/1943 | Frantz | 210/44 X |
| 2,393,976 | 2/1946 | Daman | 210/44 X |
| 2,411,288 | 11/1946 | Morse | 209/164 |
| 2,778,499 | 1/1957 | Chamberlain | 209/166 |
| 2,820,159 | 1/1958 | Monet | 210/44 |
| 2,890,795 | 6/1959 | Derino | 209/166 X |
| 3,248,324 | 4/1966 | Sweeney | 210/44 X |
| 3,307,190 | 3/1967 | Cohn | 209/166 X |
| 3,400,813 | 9/1968 | Clitheroe | 209/166 X |
| 3,619,161 | 11/1971 | Knarr | 210/44 X |
| 3,622,087 | 11/1971 | Oltmann | 423/167 X |
| 3,630,711 | 12/1971 | Burkert | 423/302 X |
| 3,653,827 | 4/1972 | Mey | 423/320 X |
| 3,937,783 | 2/1976 | Wamser | 423/319 X |
| 3,969,483 | 7/1976 | Stinson | 423/321 S X |
| 4,083,936 | 4/1978 | Woodward | 423/320 |
| 4,087,512 | 5/1978 | Reese | 423/320 X |

FOREIGN PATENT DOCUMENTS

| | | | |
|---|---|---|---|
| 551002 | 5/1958 | Canada | 209/166 |
| 1955881 | 11/1969 | Fed. Rep. of Germany | 209/166 |
| 2278628 | 2/1976 | France . | |
| 480906 | 3/1938 | United Kingdom | 209/164 |
| 289838 | 2/1971 | U.S.S.R. | 210/44 |

OTHER PUBLICATIONS

Removal of Oil and Grease from Industrial Waters, Ford & Elton, Eng. Science, Inc., Oct. 17, 1977.
Taggart, Hardbook of Mineral Dressing, 1945, pp. 21-65 thru 21-69.
Progress & Problems of Recovering Uranium from Wet-Process Phosphoric Acid, (23 pages), Hurst & Arnold & Ryon, Oct. 1976.
Chem. Abst., Vol. 81, 1974, 960195.

*Primary Examiner*—Robert Halper
*Attorney, Agent, or Firm*—Fleit & Jacobson

[57] ABSTRACT

The solid organic materials contained in wet-process phosphoric acid are removed by froth flotation in a flotation cell in which the solid organic materials overflow with the foam from the top of the cell and the acid, after passing through the cell, is passed to extraction. The froth flotation process can also be used to remove defoamer and organic soluble materials from the wet-process phosphoric acid. Uranium in the partially purified phosphoric acid product is extracted with a suitable organic extractant, typically a mixture of mono- and di-(alkylphenyl) esters of orthophosphoric acid.

19 Claims, 1 Drawing Figure

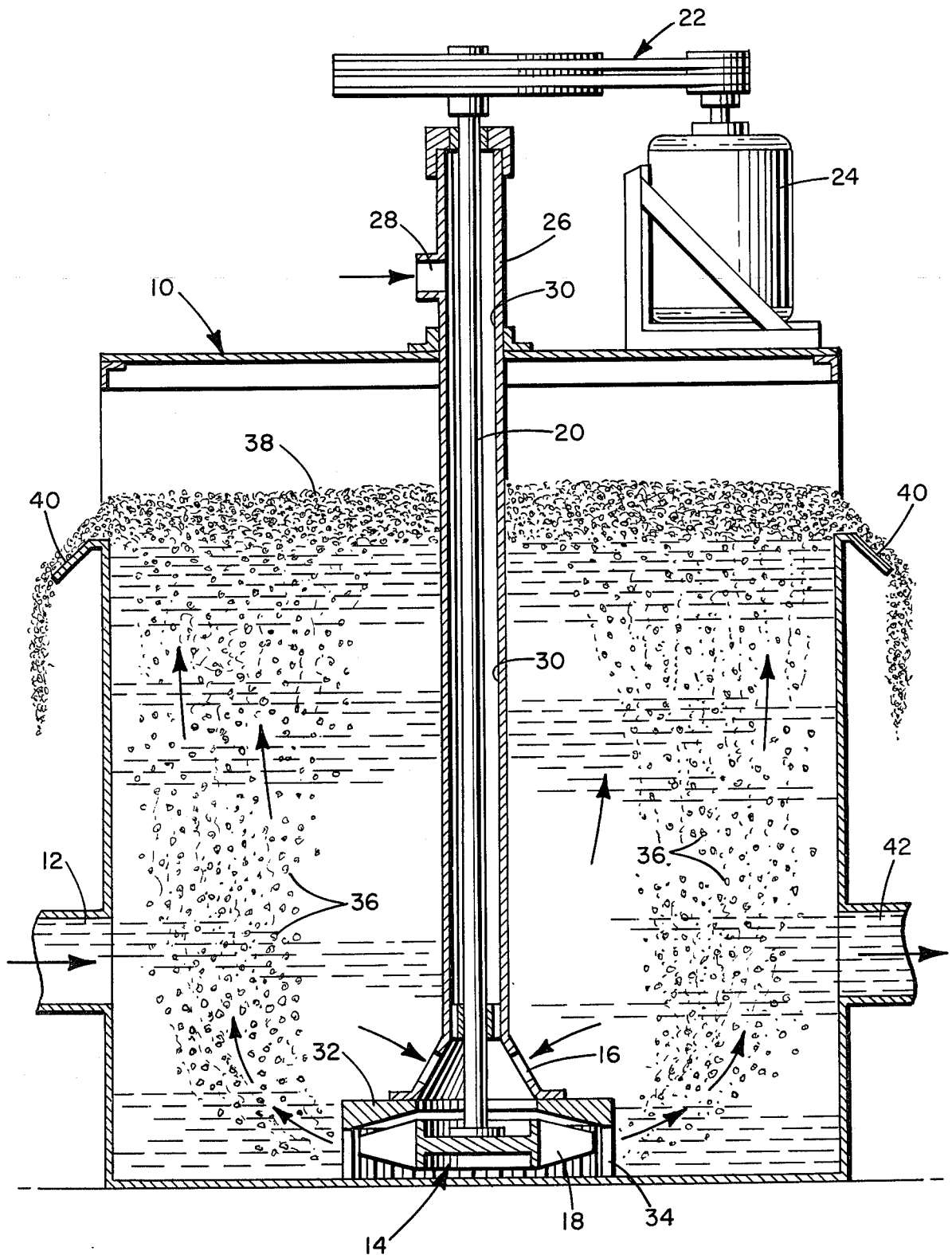

PROCESS FOR REMOVING SOLID ORGANIC MATERIALS AND OTHER IMPURITIES FROM WET-PROCESS PHOSPHORIC ACID

BACKGROUND OF THE INVENTION

This invention relates to the recovery of uranium from phosphate compounds and, more specifically, to the recovery of uranium from phosphoric acid produced by the acidulation of phosphate rock.

Most of the world's production of phosphate comes from marine phosphorites, and large deposits exist in Florida and the Western United States. These deposits generally contain from 50 to 200 ppm uranium (0.005 to 0.02%, or 0.1 to 0.4 pounds per ton). Although these concentrations are only 5% to 10% as high as those of commercially mined uranium ores, the vast extent of these deposits has made them of considerable interest as a uranium source for many years. It has been reported, for example, that mineable reserves of phosphate rock in the United States alone contain about 600,000 tons, or more than 1 billion pounds, of uranium.

During the early 1950's, considerable effort was directed toward methods of selectively leaching uranium from phosphate rock. However, it was found that alkaline leach methods were completely ineffective and that acid leaching required complete dissolution of the phosphate rock, consuming for example, several tons of sulfuric acid per pound of $U_3O_8$ recovered. By contrast, uranium ores in the Western United States are primarily sandstone deposits containing 2-5 pounds of $U_3O_8$ per ton of rock. There ores are essentially insoluble in acid and the uranium can be dissolved selectively by a relatively mild acid or alkaline digestion.

A large and increasing portion of commercial phosphate production is converted first to a relatively dilute phosphoric acid by the so-called "wet-process" (as distinguished from the furnace process which produces elemental phosphorus by direct reduction of the ore). The producer first manufactures sulfuric acid, then uses it to digest the rock. The chemical reaction forms phosphoric acid and calcium sulfate. The latter is filtered out, providing enormous quantities of gypsum, a waste product, and leaving an impure acid stream typically containing about 30% $P_2O_5$. Most of the uranium in the original rock shows up in the 30% acid, and the various extraction processes have been developed to extract it therefrom. The 30% acid is generally evaporated to about 54% "merchant acid", which is either sold or used to manufacture a variety of products, chiefly fertilizers. The higher the acid concentration, the harder it is to extract the uranium, so the 30% stage is where the uranium extraction must take place. If uranium is not extracted, it ends up as a minor impurity in the various end products.

The 30% acid can be either "black" or "green". All of the phosphate rock contains measurable amounts of organic material such as humic acids. For example, Florida phosphate rock contains as much as 0.1% and more organic material, while Western phosphate rock contains substantially more. When phosphate rock containing solid organic material is acidulated with sulfuric acid, the aqueous phase takes up the solid organic material which is of such small particle size that much of it passes through the gypsum filter. This organic material is extremely fine and has a very slow filtration rate. Accordingly, it is not economically feasible to filter the acid to remove it.

The organic material, or black particulate, causes emulsions during uranium extraction. Richard H. Kennedy in an AEC report entitled "Recovery of Uranium from Low Grade Sandstone Ores and Phosphate Rock" presented to the International Atomic Energy Agency panel in June, 1966 points out the seriousness of the emulsion problem, and that it was never satisfactorily solved in all the uranium separation operations to that date. This problem was again acknowledged in an AEC report of the Oak Ridge National Laboratory in October 1970 (ORNL-4572), and these emulsions continue today to be a serious problem to those interested in uranium separation. In particular, these emulsions will collect at the organic-aqueous interface in any solvent extraction process that utilizes an organic extractant. The volume of emulsion generated is often such that flooding occurs and the equipment must be shut down and cleaned out to remove the emulsion.

If the original organic content of the rock is too high to be tolerated in phosphoric acid production, the rock is calcined before digestion to burn out the organic content, and the acid comes out with a greenish tint. All acid produced from rock originating in the Western United States must be calcined to remove organic materials before dissolution because of the high organic content. This green acid is easier to process, but is more costly to produce. Also, up to 30% of the uranium is lost to the gypsum when the calcined rock is digested. Mose central Florida rock, which has the highest uranium content, is processed to black acid.

The 30% acid leaving the filter is supersaturated with calcium sulfate in solution and additionally contains about 1 to 2% inorganic solids. If this acid is allowed to settle for several days, the inorganic solids along with the organic solids will settle to the bottom leaving a clear dark amber solution at the top. However, clarification by settling is not desirable in a phosphoric acid plant which typically produces 400 gallons per minute of phosphoric acid solution because of the vast storage facilities that would be required and the solids handling problems associated therewith. For example, in excess of sixty tons of inorganic solids are present in the filtered acid produced each day in a typical phosphoric acid plant. Since these solids will readily settle out, it is the practice in the industry to agitate all tanks in which the acid is stored to keep the solids suspended.

A number of prior processes have been developed to recover the minor amounts of uranium contained in wet-process phosphoric acid. In many of these processes, any hexavalent uranium is first reduced to the tetravalent state by the addition of iron and then extracted by contacting the acid with an organic extractant which has a high extraction coefficient for uranium in the tetravalent state. As is known, the coefficient of extraction ($E_a^o$) is a measure of the extraction power of a reagent and is defined as the ratio of the concentration of uranium in the organic phase to the concentration of uranium in the aqueous phase at equilibrium. Thereafter, the uranium is removed from the organic extractant by one of several methods. In one of these methods, the uranium is removed from the organic extractant by contacting the organic extractant with an aqueous solution containing hydrofluoric acid or some other reagent that reacts with uranium to form uranium precipitates.

In another of these methods, the uranium is removed from the organic extractant by oxidizing the uranium in the organic extractant to the hexavalent state. Thereafter, the uranium is stripped from the organic extractant with concentrated phosphoric or hydrochloric acid. Finally, the uranium is recovered from the stripping acid, for example, by reextraction with the same organic extractant. U.S. Pat. No. 2,859,092 to Bailes et al is illustrative of these prior art processes in which uranium is first oxidized to the hexavalent state.

Other prior art processes for recovering uranium employ organic extractants having a favorable extraction coefficient ($E_a^o$) for the extraction of hexavalent uranium from phosphoric acid. When one of these extractants is used, the uranium is stripped from the organic extractant by contacting the extractant with an aqueous solution containing compounds which react with hexavalent uranium to form uranyl compounds.

One way to remove the solid organic materials such as humic acids contained in wet-process phosphoric acid is described in commonly assigned U.S. Pat. No. 4,087,512 in which the acid is contacted with a liquid hydrocarbon such as kerosene so that the solid organic materials are suspended in an emulsion within the hydrocarbon phase. The emulsion can be removed either with the liquid hydrocarbon or withdrawn continuously from the interface between the acid and liquid hydrocarbon. Subsequent separation of the solid organic materials from the emulsion may be carried out by filtration, but the filtration rate is poor because of the mixed aqueous-organic nature of the emulsion which makes suitable wetting of the filter medium difficult.

During the manufacture of wet-process phosphoric acid, antifoaming agents are often used to reduce the foam produced during the reaction of the sulfuric acid and rock. Some of these defoamers and/or the organic materials present in the acid are soluble in the liquid hydrocarbon used to clean acid by the process described in U.S. Pat. No. 4,087,512. On continued contacting of this liquid hydrocarbon with the acid the organic soluble defoamers and/or other organic soluble materials accumulate in the liquid hydrocarbon. Liquid hydrocarbon losses with consequent fresh make-up normally brings about an equilibrium level of the defoamers and/or other organic soluble materials in the liquid hydrocarbon, but the concentration has been measured in practice to be higher than 10% W/V compared with the few hundred parts per million in the acid fed to the liquid hydrocarbon cleaning unit.

These defoamers and other organic soluble impurities in the acid have been found by Ralph E. Worthington and Donald A. Luke to be strongly detrimental to the extraction of uranium and other metals using an extractant such as a mixture of mono- and di-(alkylphenyl) esters of orthophosphoric acid. Since some liquid hydrocarbon is always carried over from the cleaning system described above into the extraction stages, the defoamers and other organic soluble materials have been found by Worthington and Luke to accumulate in the organic extractant used to recover uranium and/or other metals from wet-process phosphoric acid and thereby to reduce the extraction coefficient of the extractant.

Accordingly, it is an object of the present invention to provide a process for removing solid organic materials from wet-process phosphoric acid.

A further object of the present invention is to provide a process for removing solid organic materials from wet-process phosphoric acid in a manner in which the solid organic materials can be readily separated by filtration or other suitable techniques.

Yet a further object of the present invention is to provide a process for removing organic soluble defoamers and other organic soluble materials from wet-process phosphoric acid.

A still further object of the present invention is to provide a process for removing solid organic materials, organic soluble defoamers and other organic soluble materials from wet-process phosphoric acid which is economical and minimizes the consumption of costly reagents.

SUMMARY OF THE INVENTION

These and other objects are accomplished according to the present invention wherein the solid organic materials such as humic acids contained in wet-process phosphoric acid from uncalcined rock are first removed by froth flotation in a flotation cell in which the solid organic materials overflow with the foam from the top of the cell. By this process, in excess of 95% by weight of the organic solids can be removed resulting in a residual emulsion concentration of about 0.04 to 0.08% by volume which will be encountered during uranium extraction. By contrast, as much as 20 to 25% by volume emulsion will be encountered during extraction of black acid if the organic solids are not first removed or settled. Accordingly, the frequency of flooding and the necessity for stopping the extraction process and cleaning out the emulsion is greatly reduced. In addition, the froth flotation removes a substantial portion of the defoamers and organic soluble materials with the solid organic materials in the foam overflowing from the top of the cell. The present invention therefore has the added advantage of removing at least a portion of these materials.

The froth flotation process generally comprises mixing or agitating the wet-process phosphoric acid in a flotation cell while passing gas (e.g., air) through the cell. The action of the mixing and gas addition produces a layer of froth or foam at the top of the flotation cell which contains the solid organic materials and other impurities. The foam overflows the top of the flotation cell carrying with it the solid organic materials and other impurities and the clean wet-process acid is removed as the underflow from the cell.

The wet-process phosphoric acid normally is passed through a series of flotation cells through which air is sparged. The solid organic materials and other impurities are removed with the foam overflowing from the top of the cells and the clean acid, after passing through the series of cells, is passed to extraction. The number of cells required is dependent upon the concentration of solid organic materials or other impurities in the feed acid and upon the extent to which their removal is economically or technically desirable.

BRIEF DESCRIPTION OF THE DRAWING

The FIGURE is a drawing illustrating a flotation cell in which the purification procedure of the present invention is carried out whereby the solid organic materials and other impurities are removed from wet-process phosphoric acid.

DESCRIPTION OF THE PREFERRED EMBODIMENTS

In accordance with the present invention, wet-process phosphoric acid which is obtained by the acidulation of uncalcined phosphate rock with sulphuric acid and which typically contains 25-35% $P_2O_5$ and measurable amounts of solid organic materials, such as, for example 0.1% or more, is first treated to remove the solid organic materials and other impurities contained therein. The solid organic materials inherently contained in wet-process phosphoric acid produced from uncalcined rock (black acid) such as humic acids and non-solid impurities including organic soluble defoamers and other organic soluble materials are removed by froth flotation. The following description of the froth flotation process will primarily refer to the removal of solid organic materials. It will be understood, however, that the froth flotation process also removes a substantial portion of other impurities including organic soluble defoamers and other organic soluble materials with the foam overflowing the top of the flotation cell.

The froth flotation process broadly comprises mixing or agitating the wet-process phosphoric acid in a flotation cell while passing gas through the cell. The acid mixing and gas addition produces a layer of froth or foam at the top of the flotation cell which contains the solid organic materials. The acid is mixed with sufficient turbulence at the bottom of the flotation cell so as to keep any solids (e.g., calcium sulphate) which are present in a suspended state while allowing the top of the cell to be substantially turbulence free. The gas passing through the cell primarily controls the generation of foam but also facilitates removal of the foam from the cell. The foam overflows the top of the flotation cell carrying with it the solid organic materials and the clean wet-process acid is removed as the underflow from the cell.

The cleaning process of the present invention can be performed in commercially available froth flotation equipment commonly used in the flotation of ores. Basically, the apparatus comprises a flotation cell having acid inlet and exit ports and a mixer such as a rotating impeller located near the bottom. The gas enters or is forced into the mixing zone typically through a diffuser associated with the mixer. The apparatus can also include a skimmer or the like for facilitating the removal of the foam from the top of the cell.

A plurality of flotation cells connected in series are normally employed in which the acid flows sequentially through the cells. The acid flows into the bottom of the cell from the upstream flotation cell and exits, after being cleaned, into the bottom of the downstream flotation cell. The acid is mixed by the mixer in each cell and then the foam is separated. The foam overflows into a trough at the top of each cell and is combined with the foam overflowing the other flotation cells in the series. The acid is collected at the exit of the last flotation cell and is passed to extraction.

The plurality of flotation cells can comprise a flotation tank divided into a plurality of compartments by walls or partitions which permit the flow of acid sequentially through the individual cells. In this arrangement, a mixer is provided in each of the compartments along with an associated gas diffuser or the like. The walls or partitions prevent turbulence between adjacent compartments. Alternatively, the walls or partitions can be omitted with the plurality of flotation cells simply comprising a flotation tank in which the mixers and associated gas diffusers or the like are spaced apart a sufficient distance to prevent interference between the turbulence created in each mixing zone.

The foam which overflows the top of the flotation cell comprises solid organic materials and a portion of the wet-process phosphoric acid which is cleaned by froth flotation, typically 1 to 15% of the acid volume processed. The phosphoric acid withdrawn from the flotation cell is preferably recycled for reuse. If this is done, the foam is allowed to break and then the phosphoric acid is filtered. In the filter, the organic materials are removed from the filter and sent to disposal and the filtrate recycled to the froth flotation process. The filtration rate is good because of the essentially aqueous nature of the broken foam as compared to the mixed aqueous-organic nature of the emulsion which is filtered in accordance with the process described in U.S. Pat. No. 4,087,512. It should be understood, however, that the recycled filtrate will contain a substantial amount of the defoamer and organic soluble materials originally removed from the acid with the foam. Therefore, if the phosphoric acid is recycled, the flotation process will not result in removing any substantial quantity of these materials from the acid passed to extraction.

Acid flow rates have been varied through the flotation cells between substantially zero and 10 gal/min/ft$^3$ of cell volume for a constant number of cells without marked effect on the removal rate. The preferred acid flow rate is between about 1 and 3 gals/min/ft$^3$ of cell volume. It should be understood, however, that the froth flotation process can be used to remove solid organic materials from wet-process phosphoric acid using a batch operation although this is not economically feasible from a commercial standpoint.

The gas employed is preferably air, although other gases such as nitrogen which are inert relative to the wet-process phosphoric acid can be employed. The gas can be introduced into the mixing zone under slight positive pressure, or drawn into the mixing zone by a negative pressure created in the mixing zone which pulls the gas downward into the wet-process phosphoric acid. In this process, commonly referred to as "induced gas flotation", the mixer breaks the gas stream into bubbles and intimately mixes the gas bubbles and acid. Alternatively, the wet-process phosphoric acid in the mixing zone can be saturated under pressure with the gas. Upon release of the pressure, the gas in excess of the atmospheric saturation concentration is released from solution forming bubbles. In this process commonly referred to as "dissolved gas flotation", pressures up to about 60 psi can be employed to saturate the wet-process phosphoric acid with the gas. The bubbles formed by the gas attach themselves to particles of solid organic material and help lift the particles to the surface of the cell creating a stable foam which can be skimmed or otherwise removed from the surface of the cell. Air flow rates of 1 to 50 scfm, preferably 10 to 30 scfm, are employed in both techniques of introducing gas into the mixing zone.

In order to control the quantity of foam generated, it may be necessary in addition to controlling the air flow through the flotation cell to add a defoamer, preferably of a acid soluble nature, prior to flotation. Any conventional acid soluble defoamer for wet-process phosphoric acid such as a sulphonated aliphatic alcohol or acid can be employed. Basically, the acid soluble defoamer improves the bubble stability resulting in a more stable foam at the top of the flotation cell. The acid soluble defoamer is normally added in amounts of less than about 0.5% by weight based on the volume of acid cleaned, and preferably less than about 0.05% by weight.

It has also been found that the addition of a liquid hydrocarbon such as kerosene to the wet-process phosphoric acid before flotation markedly improves the cleaning process. More particularly, the liquid hydrocarbon has been found to increase the removal of solid organic materials by as much as 50% by weight. Without being limited to the exact mechanism involved, it is believed that the liquid hydrocarbon makes the particles of solid organic material more hydrophobic so that they can be more easily lifted by the gas bubbles. The amount of liquid hydrocarbon added to the wet-process phosphoric acid is normally about 0.1 to 3% by weight based on the volume of acid treated, and preferably 1 to 2% by weight.

The term "liquid hydrocarbon" as used herein is intended to refer to hydrocarbons which are liquid at the temperatures normally encountered with freshly produced wet-process phosphoric acid (e.g., 50° to 80° C.). In other words, the hydrocarbon should have a boiling point above about 80° C., and preferably above about 125° C., under atmospheric pressure. Also, it will be appreciated that the hydrocarbon employed should be essentially immiscible with wet-process phosphoric acid. Many liquid hydrocarbons, whether cyclic or acyclic, can be used. Thus, compounds such as alkanes, alkenes, alkynes and cyclic hydrocarbon compounds can be used. Preferably, such materials as hexane, kerosene, gasoline, benzene, toluene and commercial naphthene solvents are used because of their comparatively low cost and ready availability. The preferred hydrocarbons are refined high-boiling, high-flash point aliphatic or aliphatic-aromatic solvents with or without naphthenes.

The froth flotation process can be employed at the temperature normally encountered with freshly produced wet-process phosphoric acid, namely, 50° to 80° C. As a result, it is not necessary to either cool or heat the acid to remove substantially all of the solid organic materials. This reduces the cost involved in cleaning the acid and also results in less hold-up time and storage facilities. It should be understood, however, that the process can be conducted at somewhat higher or lower temperatures than those encountered with freshly produced wet-process phosphoric acid without materially effecting the cleaning.

The term "organic soluble defoamer" as used herein is intended to refer to any organic soluble defoamer used in the phosphate industry to control the generation of foam during the digestion of the phosphate rock or at other points in the phosphoric acid production process. Typical organic soluble defoamers include sulphonated aliphatic acids such as oleic acid, tall oil and sulphonated tall oil. These defoamers are typically added to the acid in an amount of about 100 to 300 ppm. The term "organic soluble material" as used herein is intended to refer to any organic soluble material inherently present in wet-process phosphoric acid and to the organic soluble materials added by the acid producer such as flotation agents used during the froth flotation of the phosphate ores as well as miscellaneous oils and greases which accumulate in the acid during production.

After the wet-process phosphoric acid has been purified of its organic solid material content and, to a substantial extent, has been purified of its organic soluble defoamer or other organic soluble material content, the uranium is extracted from the wet-process acid and the acid is then returned to the phosphoric acid production plant to be evaporated to 54% "merchant acid". The extraction and recovery of uranium from the purified wet-process acid can be accomplished in any manner used in the art. For example, any hexavalent uranium in the wet-process acid can be reduced to the tetravalent state by the addition of iron metal or some other suitable reductant and then extracted by contacting the acid with an organic extractant which has a high extraction coefficient ($E_a^o$) for uranium in the tetravelent state such as a mixture of mono- and di-(alkylphenyl) esters of orthophosphoric acid. After extraction, the organic extractant can be stripped of its uranium content, for example, by oxidizing the uranium in the organic extractant to the hexavalent state and then stripping the extractant with concentrated phosphoric or hydrochloric acid as shown in U.S. Pat. No. 2,859,092 to Bailes et al. The uranium can also be stripped from the organic extractant by means of oxidative stripping such as disclosed in U.S. Pat. No. 3,835,214 to Hurst et al. The uranium in the stripping solution can be recovered such as shown in the Bailes et al and Hurst et al patents.

Processes for extracting and recovering uranium employing organic extractants having a favorable extraction coefficient ($E_a^o$) for the extraction of hexavalent uranium from phosphoric acid can also be employed. When one of these extractants is used, the uranium can be stripped from the organic extractant by contacting the extractant with an aqueous solution containing compounds which react with hexavalent uranium to form uranyl compounds.

In order to facilitate an easier understanding of the present invention, a drawing illustrating a flotation cell for removing organic solids from aqueous phosphoric acid solutions is provided in the FIGURE. Wet-process phosphoric acid enters the flotation cell 10 through dirty acid feedline 12. This wet-process phorphoric acid is fresh black acid which has been diverted from the phosphoric acid production plant following filtration to remove by-product calcium sulfate. It contains not only the solid organic matter but also 1 to 2% suspended inorganic solids, principally calcium sulfate, which pass through the filter as well as acid and/or organic soluble defoamers and other organic soluble materials.

The acid enters the mixing zone 14 through openings 16 and is mixed by rotating impeller 18. The rotating impeller 18 is connected via a shaft 20 and suitable drive mechanism 22 to a motor 24. The motor 24 rotates the impeller 18 at a sufficiently high speed, typically 900 to 1500 rpm, to draw acid and air into the mixing zone 14 and to create a foam which entraps the solid organic materials. The mixing of the acid also provides sufficient turbulence at the bottom of the flotation cell 10 so as to keep any solids (e.g., calcium sulphate) which are present in a suspended state while allowing the top of the cell to be substantially turbulence free.

The drive shaft 20 extends out of the flotation cell 10 and is surrounded by a housing 26 which has an opening 28 connected to an air supply and which defines an air flow passage 30 for permitting air to be introduced into the mixing zone 14 through stationary diffuser 32. The diffuser has openings 34 for permitting the acid and air to exit the mixing zone 114. The air stream is broken up into fine bubbles by the rotating impeller 18 and intermixed with the acid. The bubbles 36 exiting from the diffuser 32 rise through the cell 10 and aid in controlling and removing the foam 38.

The foam 38 including the solid organic materials overflows the flotation cell 10 at stationary weir 40 and is collected. The cleaned acid exits the cell 10 through clean acid line 42. In normal practice, a series of flotation cells 10 are employed, typically 4 to 8, with the acid flowing into the bottom of the flotation cell from the upstream cell and exiting, after being cleaned, into the bottom of the downstream cell.

The following non-limiting example further illustrates the invention:

EXAMPLE

Fresh wet-process phorphoric acid containing 0.5–3.0% solid humic compounds, 29–46 ppm of organic material distillable at 100° C. and an estimated 250–400 ppm of non-distillable organic soluble defoamer was fed at rates between 1 and 5 gpm, usually 3 gpm, to a train of four flotation cells, each of 1 ft$^3$ capacity, of the type illustrated in the FIGURE. The duration of the test was 25 days. Air was drawn into the mixing zone of each cell by the negative pressure created by the rotating impeller at a rate of 10–35 scfm and approximately 10–15% of the acid fed was removed in the overflow from the top of the cell train as froth. Control of the rate of generation of foam between these levels was brought about by the addition of an acid soluble defoamer, namely, a sodium salt of sulphonated oleic acid in an amount of less than about 0.5% W/V to the acid before flotation. Measurements showed that between 70 and 90% of the solid humic compounds originally present were removed with the foam by this treatment. Additionally, the concentration of distillable organic and non-distillable defoamer in the acid was reduced by 50–60% by the treatment.

As will be readily understood by those of ordinary skill in the art, minor modifications may be made in the process described above without in any way departing from the spirit and scope of the invention. Moreover, it will be understood that the froth flotation process can be used in combination with prior art techniques for removing the solid organic materials such as filtration to remove a substantial portion of the organic soluble defoamers and other organic soluble materials after the acid has been cleaned by filtration or the like. Accordingly, it is understood that the invention will not be limited to the exact details disclosed hereinabove, but will be defined in accordance with the appended claims.

What is claimed is:

1. A process for removing solid organic material from wet-process phosphoric acid derived from the acidulation of uncalcined phosphate rock by froth flotation comprising:
    (a) mixing the wet-process phosphoric acid and introducing gas into the wet-process phosphoric acid during the mixing to produce a foam containing at least a portion of the solid organic material; and
    (b) withdrawing the foam from the phosphoric acid.

2. The process according to claim 1 wherein the phosphoric acid is mixed in a partially enclosed flotation cell and the foam is withdrawn by allowing it to overflow the flotation cell.

3. The process according to claim 2 wherein the phosphoric acid is mixed in a plurality of flotation cells connected in series in which the phosphoric acid flows sequentially through the cells.

4. The process according to claim 2 wherein the foam withdrawn from the flotation cell is allowed to break and the organic solid material is removed from the broken foam by filtration.

5. The process according to claim 2 wherein the phosphoric acid flow rate through the cell is about 0 to 10 gals/min/ft$^3$ of cell volume.

6. The process according to claim 1 wherein the gas is either introduced under positive pressure into the phosphoric acid or drawn into the phosphoric acid by a negative pressure created by the mixing of the phosphoric acid.

7. The process according to claim 1 wherein the gas is introduced to the phosphoric acid by saturating the phosphoric acid with the gas in excess of the atmospheric saturation concentration.

8. The process according to claim 1 wherein the gas is introduced into the phosphoric acid at air flow rates of 1 to 50 scfm.

9. The process according to claim 1 wherein an acid soluble defoamer is added to the phosphoric acid to aid in controlling the foam formation.

10. The process according to claim 1 wherein a liquid hydrocarbon is added to the phosphoric acid to increase the removal of solid organic material from the phosphoric acid.

11. A process for removing solid organic material from wet-process phosphoric acid which is derived from the sulfuric acid acidulation of uncalcined phosphate rock comprising:
    (a) mixing the wet-process phosphoric acid in a partially enclosed mixing zone at a sufficient speed and with the addition of a gas into the mixing zone to create a foam which entraps the solid organic material;
    (b) allowing the foam thus formed to overflow the mixing zone and thereby remove at least a portion of the solid organic material from the phosphoric acid; and
    (c) withdrawing phosphoric acid from the mixing zone which has said at least a portion of said solid organic material removed therefrom.

12. The process according to claim 11 wherein the foam which overflows the mixing zone is collected and allowed to break, the broken foam is filtered to remove the solid organic material and the filtrate is recycled to the mixing zone.

13. A process for removing organic solids from freshly produced wet-process phosphoric acid having a concentration of about 25 to 35% P$_2$O$_5$ and containing uranium, inorganic solids including calcium sulfate and organic solids including humic acid solids, comprising mixing the phosphoric acid in a flotation cell at a temperature of about 50° to 80° C. in a manner such that foam is created entrapping at least a portion of the organic solids, permitting the foam to separate from the phosphoric acid, and removing the foam along with the entrapped organic solids and any entrained phosphoric acid overhead from the flotation cell.

14. A process for removing solid organic materials such as humic acids from wet-process phosphoric acid produced from uncalcined rock which also contains uranium and inorganic solids such as calcium sulfate by froth flotation comprising mixing the wet-process phosphoric acid in a flotation cell while passing gas through the cell, the phosphoric acid mixing and gas addition producing a layer of foam at the top of the flotation cell which contains the solid organic materials, the phosphoric acid being mixed with sufficient turbulence at the bottom of the flotation cell to keep the inorganic solids present in a suspended state while allowing the top of the cell to be substantially turbulence free, allowing the foam to overflow the top of the flotation cell and carry with it the solid organic materials, and removing relatively clean phosphoric acid as the underflow from the cell.

15. The process according to claim 14 wherein the flotation cell has acid inlet and exit means and a mixer located near the bottom, the gas is passed into a mixing zone through a diffuser associated with the mixer, and the cell includes a skimmer for facilitating the removal of the foam from the top of the cell.

16. The process according to claim 14 and further comprising flowing phosphoric acid sequentially through a plurality of flotation cells connected in series by flowing the phosphoric acid into the bottom of a flotation cell in the series from an upstream flotation cell and then, after being cleaned, into the bottom of a downstream flotation cell, combining the foam overflowing at the top of each cell with the foam overflowing the other flotation cells in the series, and collecting the acid at the exit of the last flotation cell.

17. A process for removing defoamer and organic soluble materials from wet-process phosphoric acid derived from the acidulation of uncalcined phosphate rock which has been treated to remove a substantial portion of its organic solid material content, said defoamer and organic soluble materials being soluble in an organic extractant suitable for extracting uranium from wet-process phosphoric acid, comprising:
  (a) mixing the wet-process phosphoric acid and introducing gas into the wet-process phosphoric acid during the mixing to produce a foam containing at least a portion of the defoamer and organic soluble materials; and
  (b) withdrawing the foam containing said at least a portion of the defoamer and organic soluble materials from the phosphoric acid.

18. The process according to claim 17 wherein the phosphoric acid is mixed in a partially enclosed flotation cell and the foam is withdrawn by allowing it to overflow the flotation cell.

19. The process according to claim 17 wherein a plurality of flotation cells are employed in series.

* * * * *